US012434950B2

(12) United States Patent
Lung et al.

(10) Patent No.: US 12,434,950 B2
(45) Date of Patent: Oct. 7, 2025

(54) CABLE GUIDING ASSEMBLY

(71) Applicant: REXON INDUSTRIAL CORP., LTD., Taichung (TW)

(72) Inventors: Yu-Chuan Lung, Taichung (TW); Hung-Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 316 days.

(21) Appl. No.: 18/183,261

(22) Filed: Mar. 14, 2023

(65) Prior Publication Data

US 2024/0308819 A1 Sep. 19, 2024

(51) Int. Cl.

| | |
|---|---|
| ***B66D 1/38*** | (2006.01) |
| ***B65H 57/26*** | (2006.01) |
| ***B65H 57/28*** | (2006.01) |
| ***B65H 59/10*** | (2006.01) |

(Continued)

(52) U.S. Cl.

CPC ............... *B66D 1/38* (2013.01); *B65H 57/26* (2013.01); *B65H 57/28* (2013.01); *B65H 59/10* (2013.01); *B65H 75/4402* (2013.01); *B65H 75/4405* (2013.01); *B66D 1/36* (2013.01);

(Continued)

(58) Field of Classification Search

CPC ... B66D 1/36; B66D 1/28; B66D 1/38; B66D 1/00; B65H 75/4402; B65H 75/4405; B65H 57/006; B65H 57/14; B65H 57/26; B65H 57/28; B65H 2701/33; B65H 2701/34; B65H 2701/35; B65H 2701/36; B65H 59/10; B65H 59/12; B65H 59/14;

(Continued)

(56) References Cited

U.S. PATENT DOCUMENTS 522,524 A * 7/1894 Hook ...................... B63B 21/08 248/55
2,453,184 A * 11/1948 Berry ...................... B66D 1/36 242/157.1

(Continued)

FOREIGN PATENT DOCUMENTS

CN 211895836 U * 11/2020 ............... B66D 1/36
FR 2664441 A1 * 1/1992 ......... B65H 75/4402

(Continued)

*Primary Examiner* — Anna M Momper
*Assistant Examiner* — Raveen J Dias
(74) *Attorney, Agent, or Firm* — Brooks Kushman P.C.

(57) ABSTRACT

A cable guiding assembly is mounted to a cable guide seat and for extension of a cable therethrough, and includes first and second housings, a pivot connecting unit and a locking mechanism. The pivot connecting unit includes first and second pivot connecting portions disposed on and pivotably connected to the first and second housings, respectively, such that the first housing is pivotable relative to the second housing between a close position, where the first and second housings cooperatively define an accommodating space and permit the cable to extend therethrough, and an open position that permits the cable to be installed to and removed from the cable guiding assembly. The locking mechanism includes first and second locking units disposed respectively on first and second housings, respectively opposite to the first and second pivot connecting portions and detachably engaging each other to secure the first housing at the close position.

10 Claims, 9 Drawing Sheets

(51) Int. Cl.
*B65H 75/44* (2006.01)
*B66D 1/36* (2006.01)

(52) U.S. Cl.
CPC ...... *B65H 2701/34* (2013.01); *B65H 2701/35* (2013.01); *B65H 2701/36* (2013.01)

(58) Field of Classification Search
CPC ........ B65H 59/16; B65H 59/18; B65H 59/20; B65H 59/22; B65H 59/26
USPC ............................................... 242/397, 397.2
See application file for complete search history.

(56) References Cited

U.S. PATENT DOCUMENTS

| | | | | | |
|---|---|---|---|---|---|
| 2,660,382 | A * | 11/1953 | Wilson | B66D 1/36 | 242/478.2 |
| 3,970,287 | A * | 7/1976 | Robards | B66D 1/36 | 254/389 |
| 5,573,226 | A * | 11/1996 | Smith | B65H 57/14 | 242/615.3 |
| 5,863,029 | A * | 1/1999 | Fanger | B66D 1/38 | 254/389 |
| 9,533,862 | B2 * | 1/2017 | Ho | B66D 1/38 | |
| 2004/0262443 | A1 * | 12/2004 | Hamm | B65H 75/4405 | 242/397.2 |
| 2005/0116079 | A1 * | 6/2005 | Stevens | B60D 1/185 | 242/397.3 |
| 2005/0258302 | A1 * | 11/2005 | McDaniel | B66D 1/36 | 242/615.2 |
| 2009/0014571 | A1 * | 1/2009 | Belford | B65H 75/4405 | 242/118 |
| 2009/0140092 | A1 * | 6/2009 | Hoover | B65H 59/26 | 242/151 |
| 2011/0168962 | A1 * | 7/2011 | Yang | B66D 3/006 | 254/393 |
| 2016/0016766 | A1 * | 1/2016 | Ho | B66D 1/38 | 242/397.3 |
| 2016/0200546 | A1 * | 7/2016 | Rich | B65H 57/14 | 242/615.2 |
| 2020/0207593 | A1 * | 7/2020 | Hall | B66D 1/38 | |
| 2020/0277169 | A1 * | 9/2020 | Zhan | B66D 1/38 | |
| 2022/0112055 | A1 * | 4/2022 | Vaughn | B66D 1/56 | |
| 2022/0153549 | A1 * | 5/2022 | Izaguirre | B65H 57/14 | |
| 2024/0327176 | A1 * | 10/2024 | Lung | B66D 1/28 | |
| 2024/0343532 | A1 * | 10/2024 | Vaughn | B66D 1/58 | |

FOREIGN PATENT DOCUMENTS

| | | | | |
|---|---|---|---|---|
| KR | 101428963 | B1 * | 8/2014 | B65H 75/4402 |
| WO | WO-0112536 | A1 * | 2/2001 | B66D 1/38 |
| WO | WO-2015010412 | A1 * | 1/2015 | B65H 57/12 |

* cited by examiner

CABLE GUIDING ASSEMBLY

FIELD

The disclosure relates to a cable guiding assembly, and more particularly to a cable guiding assembly for extension of a cable therethrough.

BACKGROUND

A conventional cable guiding assembly is mounted to a winch for winding a cable and permitting the cable to extend therethrough. The conventional cable guiding assembly includes a seat body and a plurality of cable guiding wheels. The seat body defines two openings, and each of the openings is substantially equal to a diameter of the cable and is for extension of the cable therethrough. The cable guiding wheels are disposed in the seat body, and are spaced apart from each other in a direction where the cable extends. When operating the winch to wind up or let out the cable, the cable is first brought to extend into the openings and is clamped among the cable guiding wheels. In this way, the cable guiding wheels may prevent the cable from jumping off from a reel of the winch, which may tangle the cable and adversely affect smoothness of winding or unwinding of the cable.

However, it is time-consuming and labor-intensive to insert the cable into the openings and then secure the cable among the cable guiding wheels during use of the conventional cable guiding assembly.

SUMMARY

Therefore, an object of the disclosure is to provide a cable guiding assembly that can alleviate at least one of the drawbacks of the prior art. According to the disclosure, a cable guiding assembly is adapted to be mounted to a cable guide seat and for extension of a cable therethrough. The cable guiding assembly includes a first housing, a second housing, a pivot connecting unit, and a locking mechanism. The first housing is adapted to be mounted to the cable guide seat. The second housing is pivotably connected to the first housing. The pivot connecting unit includes a first pivot connecting portion disposed on the first housing, and a second pivot connecting portion disposed on the second housing and pivotably connected to the first pivot connecting portion such that the first housing is pivotable relative to the second housing between a close position and an open position. When the first housing is at the close position, the first housing and the second housing cooperatively define an accommodating space that has two opposite cable openings adapted to communicate with external environment and permit the cable to extend therethrough. When the first housing is at the open position, the cable is permitted to be installed to and removed from the cable guiding assembly. The locking mechanism includes a first locking unit and a second locking unit. The first locking unit is disposed on the first housing, and is opposite to the first pivot connecting portion. The second locking unit is disposed on the second housing, is opposite to the second pivot connecting portion, and detachably engages the first locking member to secure the first housing at the close position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
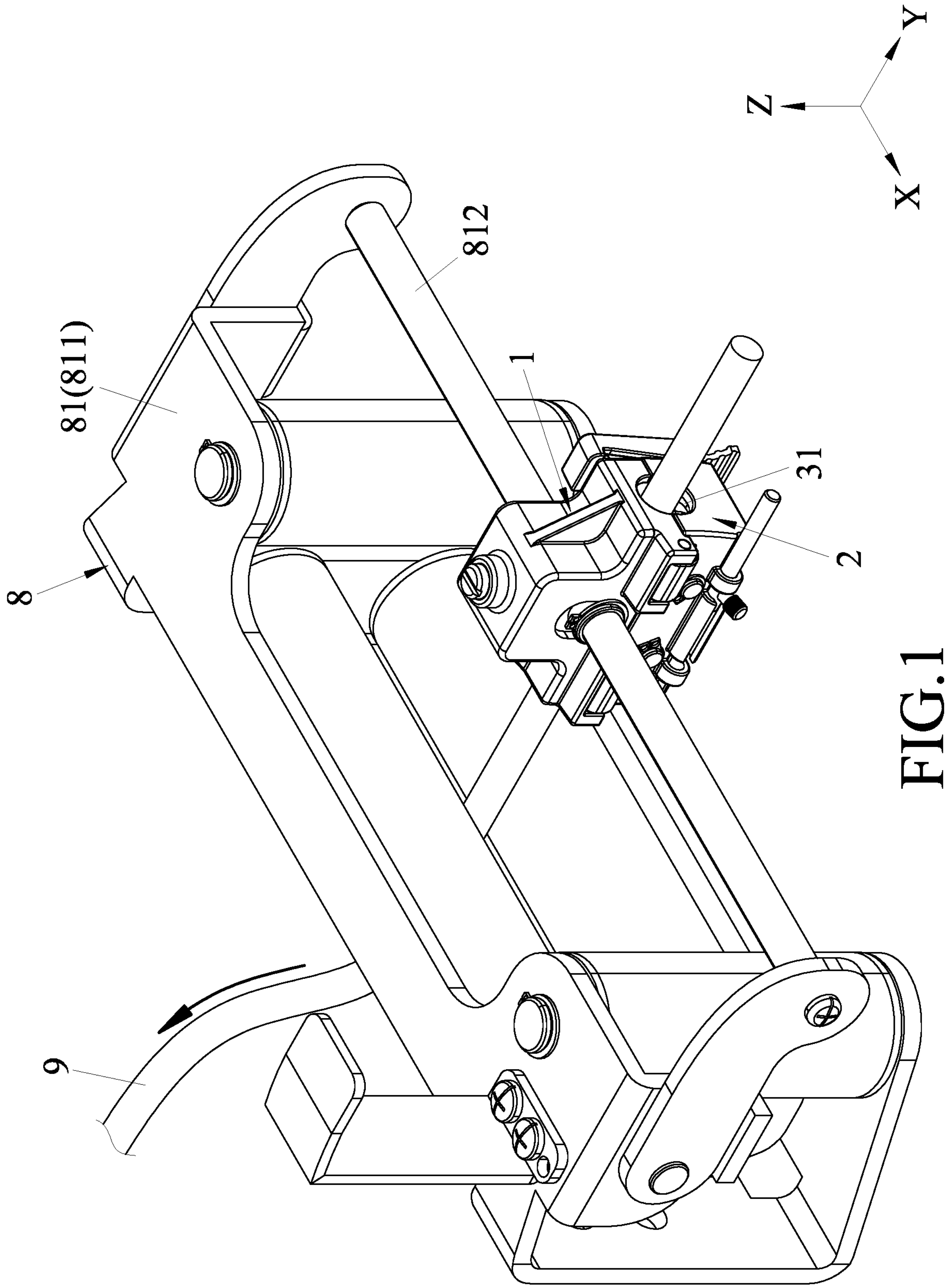
FIG. 1 is a perspective view of a cable guiding assembly of an embodiment according to the present disclosure being mounted to an elongated rod of a cable guide seat for guiding a cable to extend therethrough.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
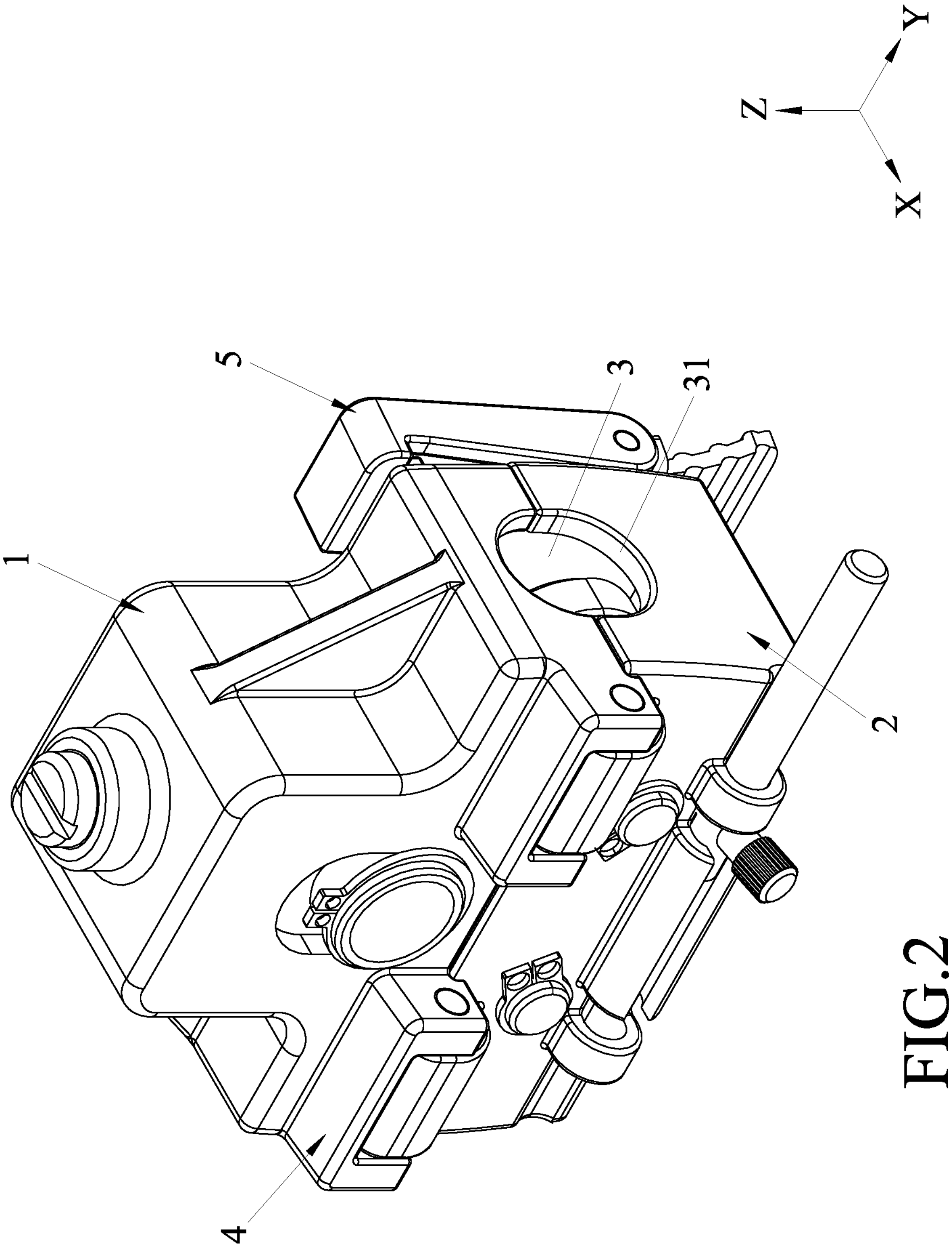
FIG. 2 is a perspective view of the embodiment, illustrating a first housing and a second housing of the embodiment.
Figure 3:
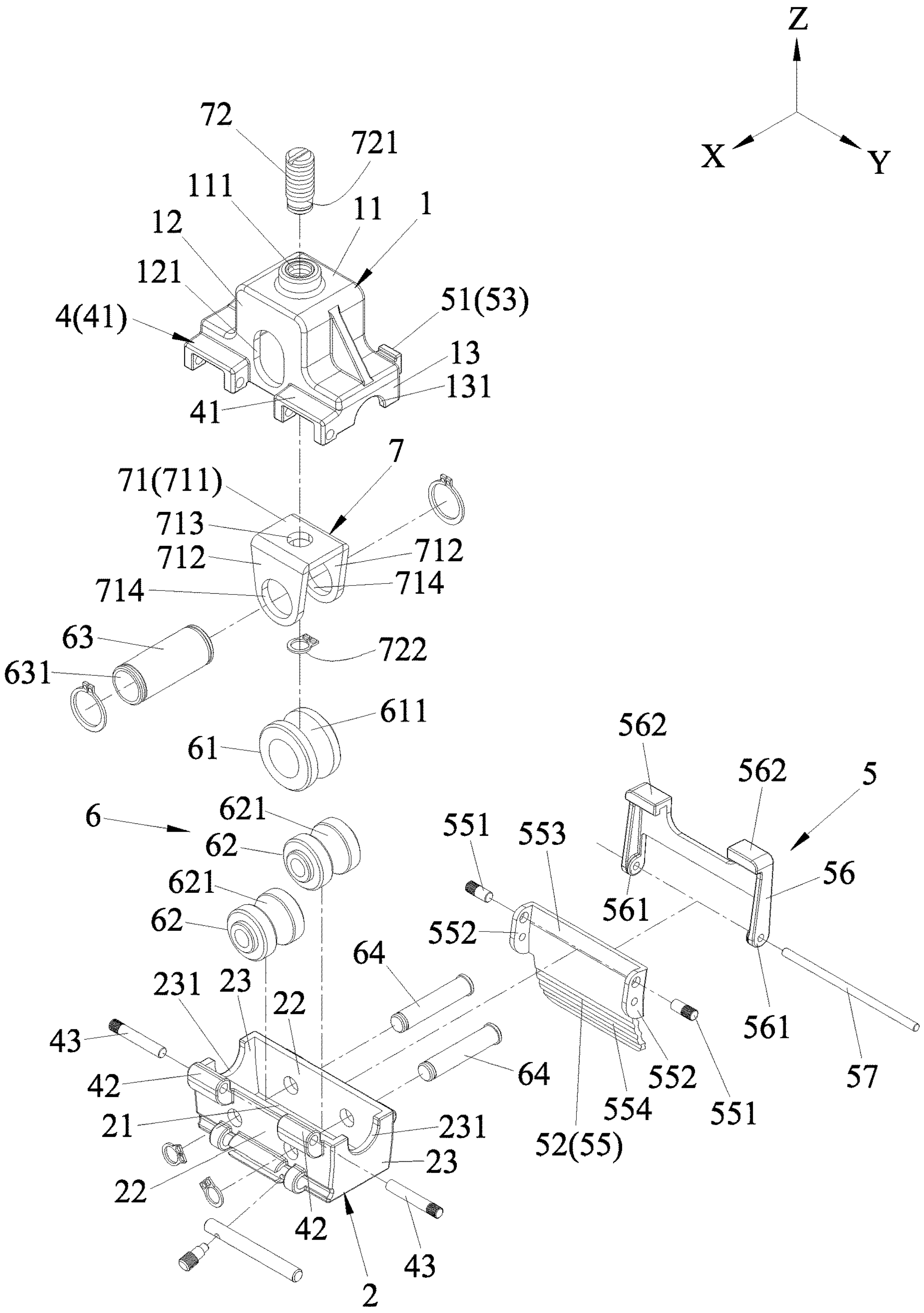
FIG. 3 is an exploded perspective view of the embodiment.
Figure 8:
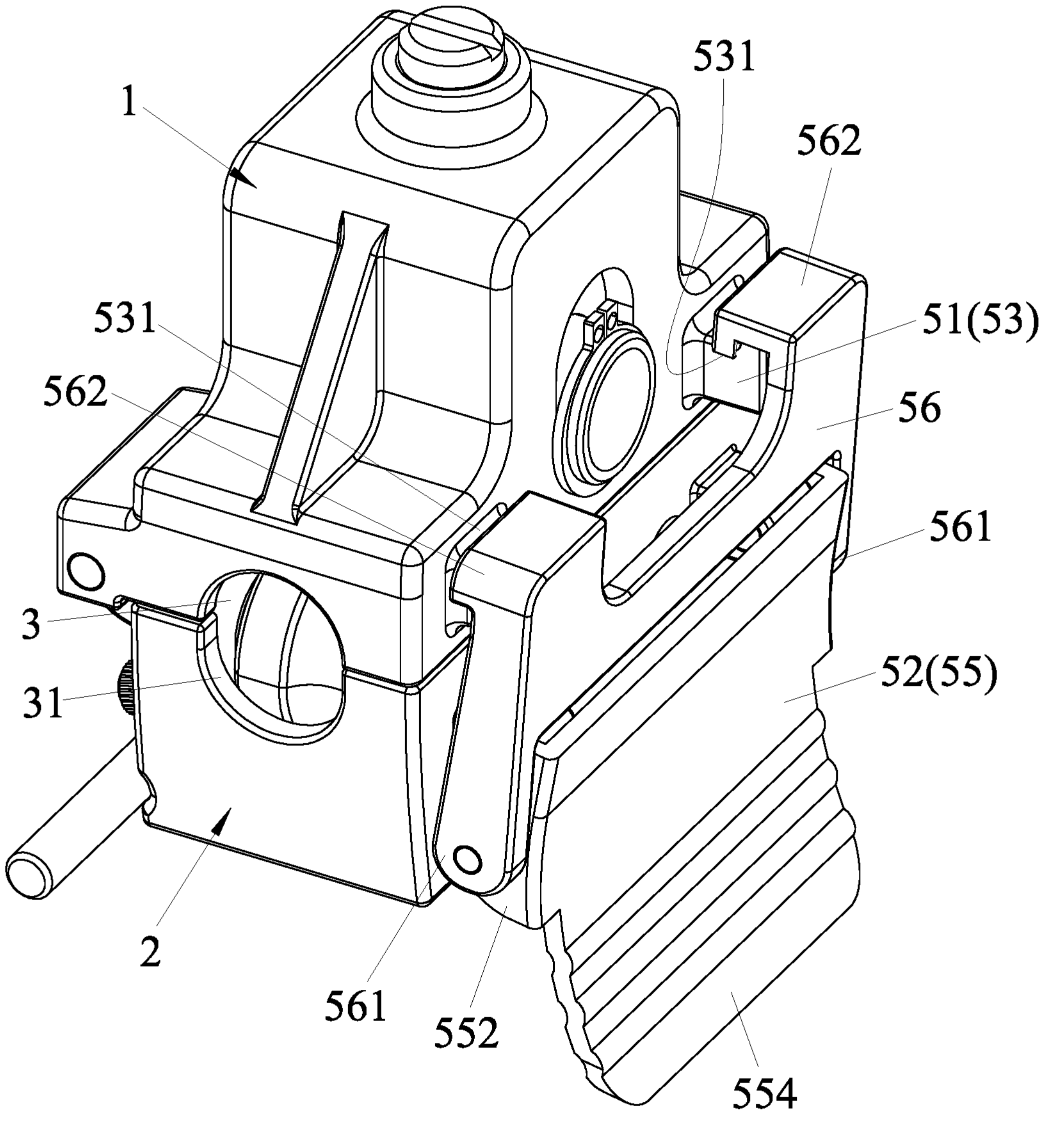
FIG. 8 is another perspective view of the embodiment seen from another view of angle different from FIG. 2, illustrating the first housing being at a close position.

Referring to FIGS. 1 to 3, a cable guiding assembly of an embodiment according to the present disclosure is adapted to be mounted to a winch device 8 for extension of a cable 9 therethrough. The winch device 8 includes a cable guide seat 81 and a winch (not shown). The cable guide seat 81 includes a seat body 811, and an elongated rod 812 that extends through the cable guiding assembly in a first direction (X) and that permits the cable guiding assembly to move therealong. The cable guiding assembly includes a first housing 1, a second housing 2, a pivot connecting unit 4, a locking unit 5, a guide wheel unit 6, and an adjusting unit 7. The first housing 1 is connected pivotably to the second housing 2 by the pivot connecting unit 4, and is pivotable relative to the second housing 2 between a close position (see FIGS. 2 and 8), where the first housing 1 and the second housing 2 cooperatively define an accommodating space 3 that has two opposite cable openings 31 (only one is visible in FIG. 2) adapted to communicate with external environment and permit the cable 9 to slidably extend therethrough, and an open position (see FIG. 9) for permitting the cable 9 to be installed to and removed from the cable guiding assembly.

Figure 4:
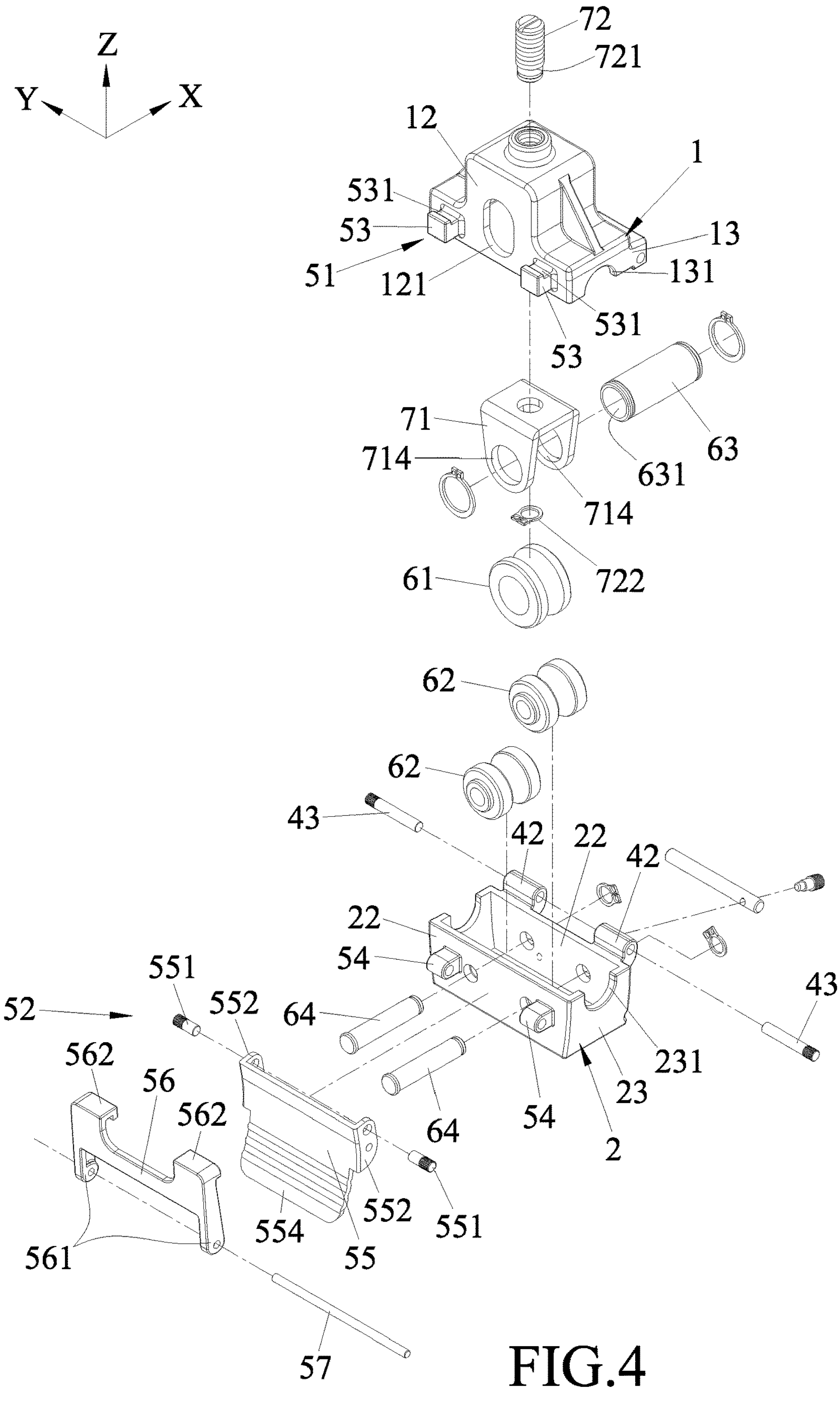
FIG. 4 is another exploded perspective view of the embodiment seen from another view of angle different from FIG. 3.

Further referring to FIG. 4, the first housing 1 includes a first base wall 11, two first side walls 12, and two first guidance walls 13. The first side walls 12 are connected to the first base wall 11, and are spaced apart from each other in the first direction (X) when the first housing 1 is at the close position. The first guidance walls 13 are connected to the first base wall 11, interconnect the first side walls 12, and are spaced apart from each other in a second direction (Y) perpendicular to the first direction (X) when the first housing 1 is at the close position. The first base wall 11 has an adjustment screw hole 111 extending therethrough in a third direction (Z) perpendicular to the first direction (X) and the second direction (Y), and communicating with the accommodating space 3 when the first housing is at the close position.

Each of the first side walls 12 has a through hole 121 that is elongated in the third direction (Z), and that communicates with the accommodating space 3 when the first housing 1 is at the close position.

Each of the first guidance walls 13 has a first notch 131 formed opposite to the first base wall 11.

The second housing 2 includes a second base wall 21 spaced apart from the first base wall 11 in the third direction (Z), two second side walls 22 connected to the second base wall 21 and spaced apart from each other in the first direction (X), and two second guidance walls 23 connected to the second base wall 21, interconnecting the second side walls 22, and spaced apart from each other in the second direction (Y). Each of the second guidance walls 23 cooperates with a respective one of the first guidance walls 13 to define a respective one of the cable openings 31 when the first housing 1 is at the close position. Specifically, each of the second guidance walls 23 has a second notch 231 formed opposite to the second base wall 21, and cooperates with the first notch 131 of the respective one of the first guidance walls 13 to define the respective one of the cable openings 31 when the first housing 1 is at the close position.

The pivot connecting unit 4 includes two first pivot connecting portions 41 disposed on the first housing 1, two second pivot connecting portions 42 disposed on the second housing 2, and two pins 43. The second pivot connecting portions 42 are respectively and pivotably connected to the first pivot connecting portions 41 by the pins 43, respectively, such that the first housing 1 is pivotable relative to the second housing 2 between the close position and the open position.

Specifically, the first pivot connecting portions 41 are connected to one of the first side walls 12, and are spaced apart from each other in the second direction (Y). The second pivot connecting portions 42 are spaced apart from each other in the second direction (Y), are connected to one of the second side walls 22, and respectively and pivotably connected to the first pivot connecting portions 41. In this embodiment, the first pivot connecting portions 41 are configured as covers respectively covering the second pivot connecting portions 42, and each of the pins 43 is inserted into one of the first pivot connecting portions 41 and the respective one of the second pivot connecting portions 42 such that the first housing 1 is pivotable relative to the second housing 2 about the pins 43.

In other variations, the pivot connecting unit 4 may include one first pivot connecting portion 41, one second pivot connecting portion 42, and one pin 43 extending through the first pivot portion 41 and the second pivot portion 42. It should be noted that, as long as the first housing 1 is pivotably connected to the second housing 2, configuration of the first pivot connecting portion 41, the second pivot portion 42 and the pins 43 may be modified, and the embodiment is not limited to the example described herein.

Figure 5:
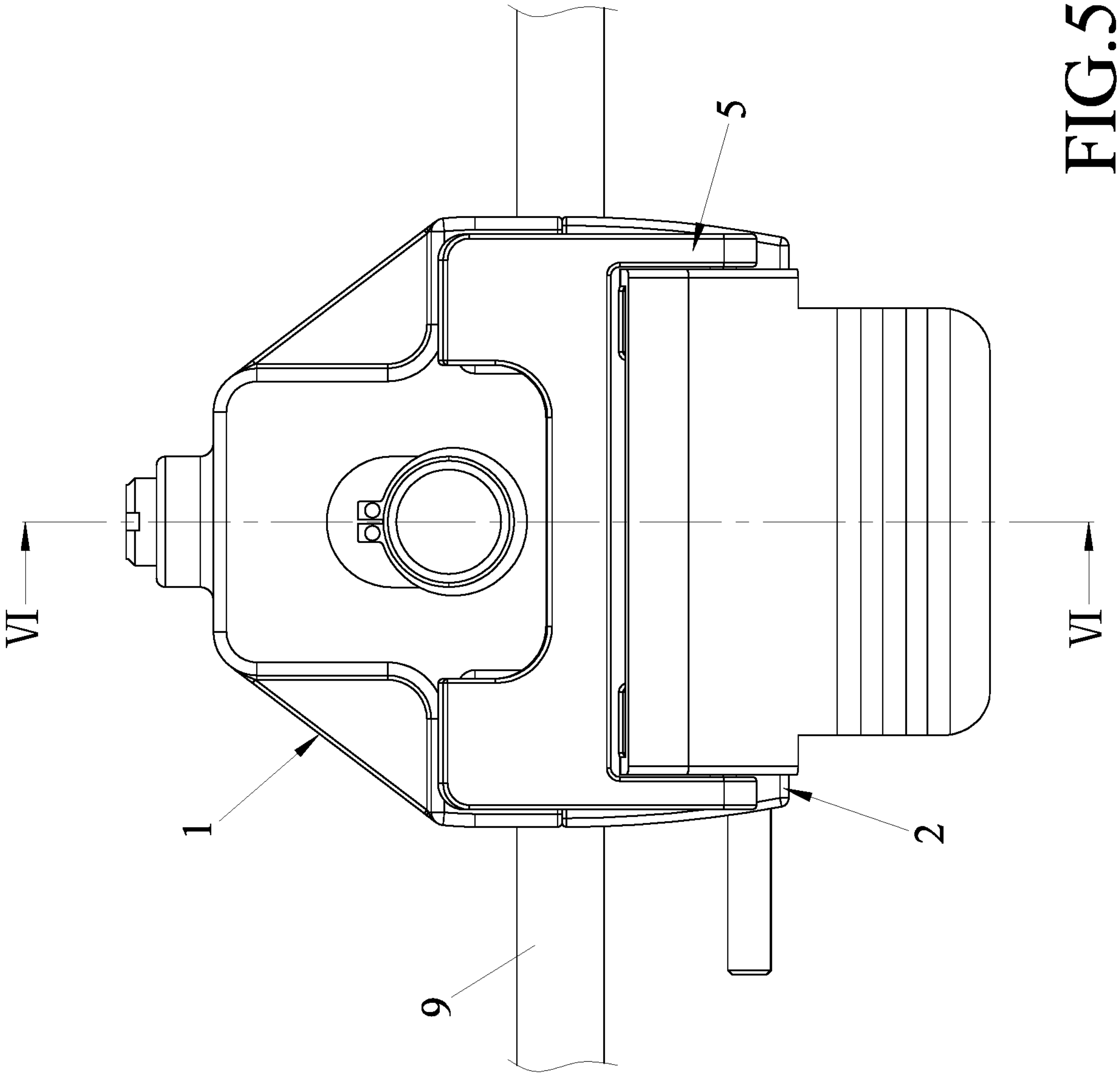
FIG. 5 is a fragmentary side view of the embodiment and a cable extending therethrough.
Figure 6:
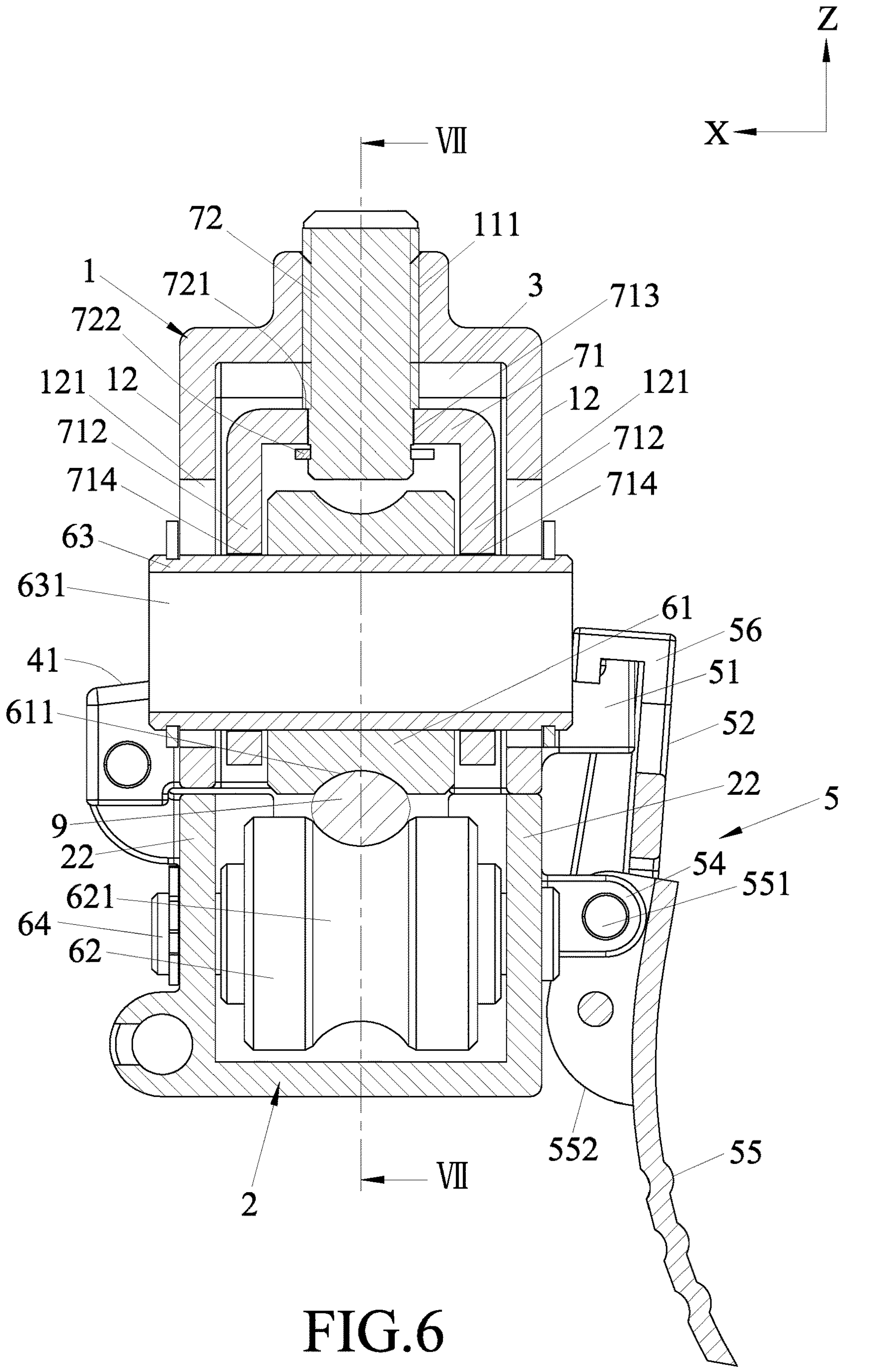
FIG. 6 is a sectional view taken along line VI-VI in FIG. 5.

Further referring to FIGS. 5 and 6, the locking unit 5 is for securing the first housing 1 at the close position. The locking unit 5 includes a first locking unit 51 that is disposed on the first housing 1 and that is opposite to the first pivot connecting portions 41, and a second locking unit 52 that is disposed on the second housing 2, that is opposite to the second pivot connecting portions 42, and that detachably engages the first locking unit 51.

The first locking unit 51 is connected to the other one of the first side walls 12 of the first housing 1 that is not connected to the first pivot connecting portions 41. The second locking unit 52 is connected to the other one of the second side walls 22 that is not connected to the second pivot connecting portions 42. The first locking unit 51 includes two protrusions 53 that are disposed on and protrude from the respective one of the first side walls 12, and that are respectively located on two opposite sides of the through hole 121 of the respective one of the first side walls 12 in the second direction (Y). Each of the protrusions 53 has an engaging groove 531. The second locking unit 52 includes two lugs 54 disposed on and connected to the respective one of the second side walls 22, an operating plate 55 pivotably relative to the respective one of the second side walls 22, a securing plate 56 pivotably connected to the operating plate 55, and a pivot rod 57 extending through the securing plate 56 and the operating plate 55.

The operating plate 55 includes two pillars 551 that are respectively connected to the lugs 54, two first connection portions 552 that are connected respectively to the pillars 551 such that the first connection portions 552 are pivotable relative to the lugs 54, an interconnecting portion 553 that interconnects co-movably to the first connection portions 552, and an operating portion 554 that is connected co-movably to the interconnecting portion 553 and that is operable to pivot the operating plate 55 relative to the respective one of the second side walls 22.

The securing plate 56 has two second connection portions 561 that are connected respectively and pivotably to the first connection portions 552, and two securing portions 562 that are distal from the second connection portions 561. Further referring to FIGS. 8 and 9, when the first housing 1 is at the close position, the operating portion 554 of the operating plate 55 is proximate to the second housing 2, and the securing portions 562 of the securing plate 56 engage respectively the engaging grooves 531 of the protrusions 53. When the first housing 1 is at the open position, the operating portion 554 of the operating plate 55 is away from the second housing 2, and the securing portions 562 of the securing plate 56 are respectively disengaged from the engaging grooves 531 of the protrusions 53.

Figure 7:
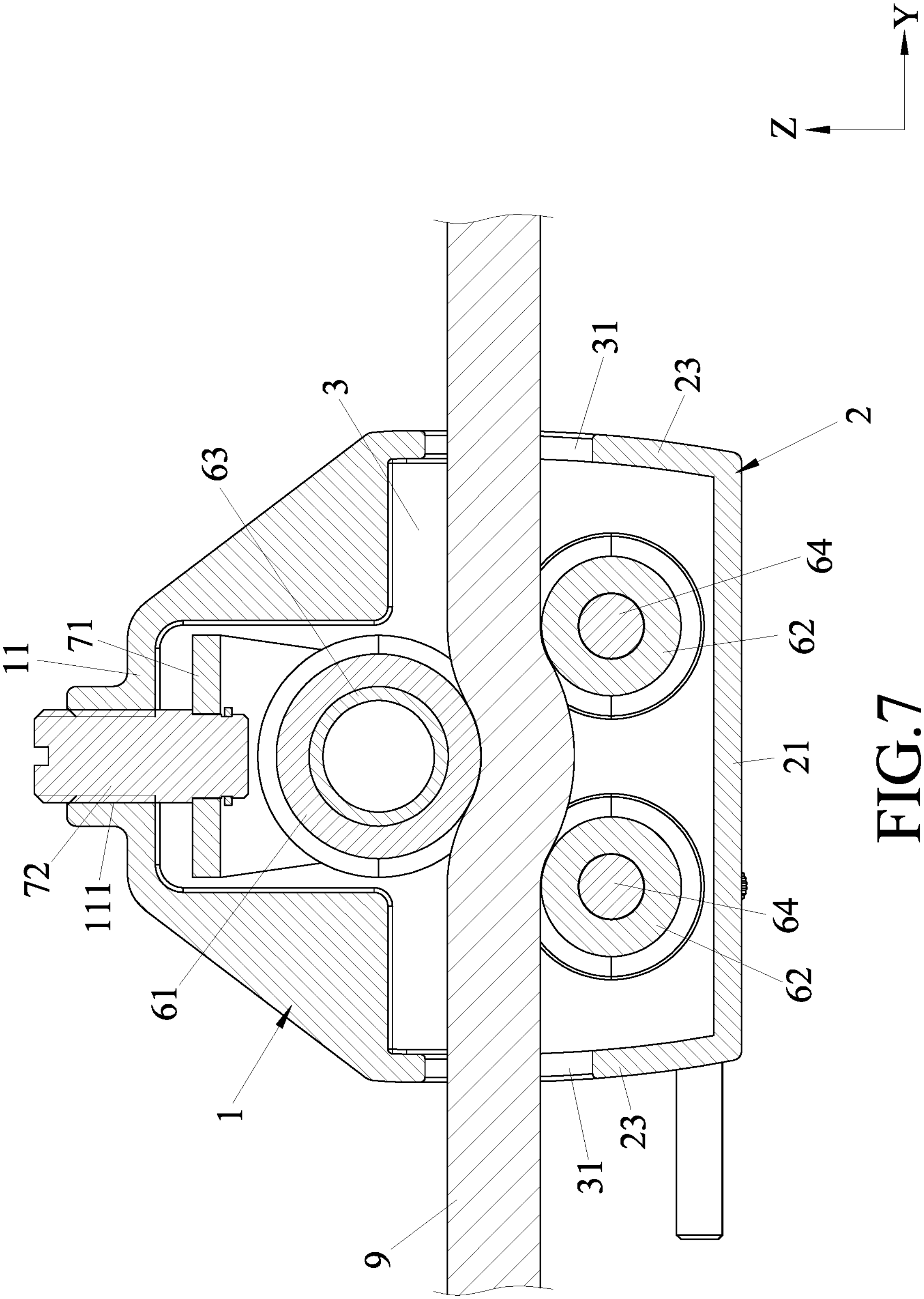
FIG. 7 is a sectional view taken along line VII-VII in FIG. 6.

Referring to FIGS. 6 and 7, the guide wheel unit 6 includes a first guide wheel 61, two second guide wheels 62, a first shaft 63, and two second shafts 64.

The first guide wheel 61 is mounted rotatably between the first side walls 12, and has a first annular groove 611 formed therearound. The first shaft 63 extends through the first guide wheel 61, extends through the through hole 121 of each of the first side walls 12, and is movable along the through holes 121. The first guide wheel 61 is rotatable about and co-movable with the first shaft 63. In this embodiment, two C-rings are respectively sleeved on two opposite end portions of the first shaft 63 and are connected to the first side walls 12 so the first shaft 63 is connected to the first housing 1. The first shaft 63 has an axial hole 631 extending in the first direction (X) and adapted for extension of the elongated rod 812 of the cable guide seat 81 therethrough (see FIG. 1), so that the cable guiding assembly of the embodiment is movable along the elongated rod 812.

The second guide wheels 62 are spaced apart from each other in the second direction (Y), are mounted rotatably between the second side walls 22, and are adapted to cooperate with the first guide wheel 61 to guide and clamp the cable 9 thereamong when the first housing 1 is at the close position. Each of the second guide wheels 62 has a second annular groove 621 that is formed therearound, and that is adapted to cooperate with the first annular groove 611 to retain the cable 9 therein when the first housing 1 is at the close position. The second shafts 64 extend respectively through the second guide wheels 62, and extend through the second side walls 22. The second guide wheels 62 are rotatable respectively around the second shafts 64. The second shafts 64 are connected to the second housing 2 by C-rings in a manner similar to the way that the first shaft 63 is connected to the first housing 1. It should be noted that the number of the C-rings for connecting the first shaft 63 and the second shafts 64 correspondingly to the first housing 1 and the second housing 2 is not limited to two, and the configurations of the first shaft 63 and the second shafts 64 may be modified in other embodiments of the present disclosure.

The adjusting unit 7 includes an adjusting frame 71 that is mounted in the first housing 1, and an adjusting rod 72 that extends through and threaded engages the adjustment screw hole 111 and that is connected to the adjusting frame 71.

The adjusting frame 71 includes a main plate 711 and two lateral plates 712. The main plate 711 is disposed between the first guide wheel 61 and the first base wall 11 in the third direction (Z), and has a mounting hole 713 for extension of the adjusting rod 72 therethrough. The lateral plates 712 are opposite in the first direction (X), are connected to the main plate 711, and are formed respectively with two engaging holes 714. The first shaft 63 extends through the engaging holes 714, and is co-movable with the adjusting frame 71 along the through holes 121. When the first housing 1 is at the close position, the lateral plates 712 are disposed respectively at opposite sides of the first guide wheel 61 in the first direction (X). The adjusting rod 72 includes an accessible portion that is exposed outwardly of the adjustment screw hole 111 and that is accessible by a user, and an inserted portion that is opposite to the accessible portion in the third direction (Z), that extends through the adjustment screw hole 111 and the mounting hole 713, that is rotatable relative to the adjusting frame 71, that is connected to the adjusting frame 71, and that is immovable relative to the adjusting frame 71 in the third direction (Z). In this embodiment, as shown in FIG. 6, the inserted portion of the adjusting rod 72 has a shoulder portion 721 and a ring portion 722, and the main plate 711 is clamped between the shoulder portion 721 and the ring portion 722 such that rotation of the adjusting rod 72 relative to the first housing 1 drives movement of the adjusting frame 71, the first shaft 63 and the first guide wheel 61 along the through holes 121 to adjust a distance between the first guide wheel 61 and the second guide wheels 62 in the third direction (Z). In this way, in a case where a cable having different diameter is to be used, the distance between the first guide wheel 61 and the second guide wheels 62 may be easily adjusted by rotating the adjusting rod 72.

As shown in FIGS. 5 to 8, when the first housing 1 is at the close position, the securing portions 562 of the securing plate 56 of the second locking unit 52 engage respectively the engaging grooves 531 of the protrusions 53 of the second locking member 51 so the first housing 1 is secured at the close position. At this position, the first housing 1 cooperates with the second housing 2 to define the accommodating space 3 and the cable openings 31, the operating portion 554 of the operating plate 55 is adjacent to the second housing 2, and the cable 9 extends slidably through the cable openings 31 and the accommodating space 3. Specifically, when the first housing 1 is at the close position, the cable 9 is slidably retained among the first annular groove 611 of the first guide wheel 61 and the second annular grooves 621 of the second guide wheels 62, and is clamped among the first guide wheel 61 and the second guide wheels 62, so the cable 9 may be positioned relative to the cable guiding assembly while the winch of the winch device 8 (see FIG. 1) is operated to wind and unwind the cable 9.

Figure 9:
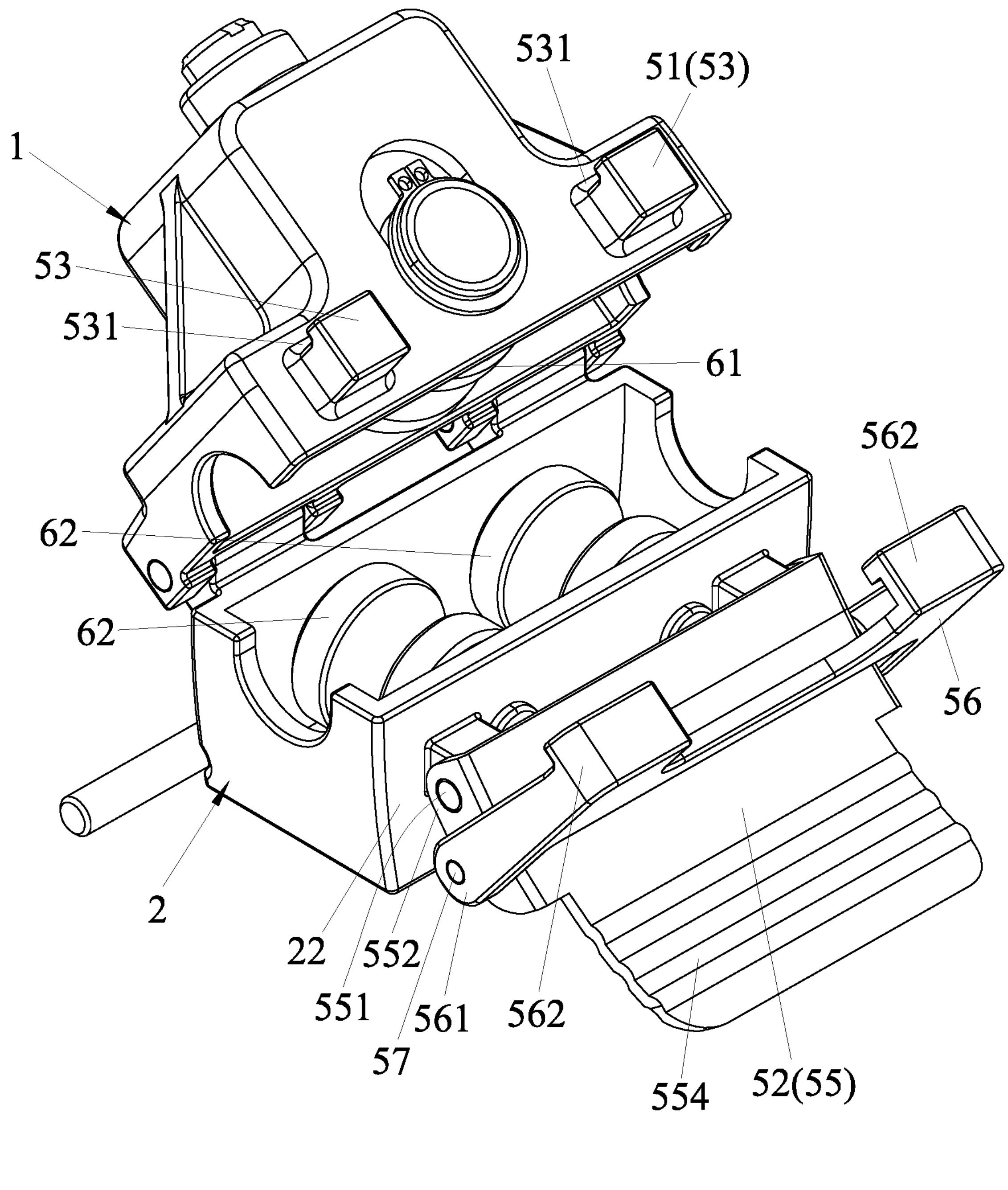
FIG. 9 is a view similar to FIG. 8, but illustrating the first housing being at an open position.

As shown in FIG. 9, when the first housing 1 is at the open position, the operating plate 55 is away from the second housing 2 after the operating portion 554 is moved away from the second housing 2. At this position, the securing portions 562 respectively disengage from the engaging grooves 531, and the cable 9 may be easily installed to and removed from the first housing 1 and the second housing 2.

To move the first housing 1 from the closed position to the open position, the operating portion 554 of the operating plate 55 is operated away from the second housing 2 by an external force and the operating plate 55 pivots away from the second housing 2, so the second connection portions 561 of the securing plate 6 pivot relative to the first connection portions 552 of the operating plate 55, and the engaging portions 562 disengage respectively from the engaging grooves 531 of the protrusions 53. On the other hand, when it is desired to move the first housing 1 from the open position to the close position, the first housing 1 is first pivoted toward the second housing 2, and the engaging portions 562 are brought to engage the engaging grooves 531, respectively. Then, the operating portion 554 of the operating plate 55 is moved toward the second housing 2, so the first housing 1 is secured at the close position. It should be noted herein that, since the first housing 1 is mounted on the elongated rod 812 of the winch device 8 (see FIG. 1), the second housing 2 is operated to pivot relative to the first housing 1 in actual operation to move the first housing 1 from the close position to the open position so the cable 9 may be installed on and removed from the cable guiding assembly.

By virtue of the above description, the advantages of the present disclosure are summarized as follows:

First, by virtue of the first housing 1 that is pivotable relative to the second housing 2 between the open position and the close position, it is relatively simple to remove or to install the cable 9 to the cable guiding assembly. Furthermore, the configuration of the operating plate 55 facilitates the engaging portions 562 of the securing plate 56 to disengage from the engaging grooves 531, so it is convenient to move the first housing 1 from the closed position to the open position.

Second, by virtue of the first annular groove 611 of the first guide wheel 61 and the second annular grooves 621 of the second guide wheels 62, the cable 9 is retained thereamong and may be prevented from being in direct contact with the first housing 1 and the second housing 2 such that winding and unwinding of the cable 9 may be achieved smoothly and quickly.

Third, since the elongated rod 812 of the cable guide seat 81 loosely extends through the axial hole 631 of the first shaft 63, the cable guiding assembly may be slightly moved by the cable 9 to shift along the elongated rod 812 to thereby compensate offsetting of the cable 9 in the first direction (X) when the cable 9 winds around or unwinds from the winch device 8, which facilitates the cable 9 to be smoothly wound around and unwound from the winch device 8.

Fourth, rotation of the adjusting rod 72 relative to the first housing 1 drives movement of the first guide wheel 61 relative to the second guide wheels 62 in the third direction (Z) such that a cable having different diameter may be clamped among the first guide wheel 61 and the second guide wheels 62, and thus applicability of the cable guiding assembly of the embodiment is improved.

In summary, by virtue of the first housing 1 being pivotable between the open position and the close position, the cable 9 may be easily installed to and removed from the cable guiding assembly.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cable guiding assembly adapted to be mounted to a cable guide seat and for extension of a cable therethrough, said cable guiding assembly comprising:
- a first housing adapted to be mounted to the cable guide seat;
- a second housing pivotably connected to said first housing;
- a pivot connecting unit including
  - a first pivot connecting portion disposed on said first housing, and
  - a second pivot connecting portion disposed on said second housing and pivotably connected to said first pivot connecting portion such that said first housing is pivotable relative to said second housing between a close position where said first housing and said second housing cooperatively define an accommodating space that has two opposite cable openings adapted to communicate with an external environment and permit the cable to extend therethrough, and an open position for permitting the cable to be installed to and removed from said cable guiding assembly; and
- a locking mechanism including
  - a first locking unit disposed on said first housing and opposite to said first pivot connecting portion, and
  - a second locking unit disposed on said second housing, opposite to said second pivot connecting portion, and detachably engaging said first locking unit to secure said first housing at the close position;

wherein:
- said first housing includes
  - a first base wall,
  - two first side walls connected to said first base wall, respectively connected to said first pivot connecting portion and said first locking unit, and spaced apart from each other in a first direction when said first housing is at the close position, and
  - two first guidance walls connected to said first base wall, interconnecting said first side walls, and spaced apart from each other in a second direction perpendicular to the first direction when said first housing is at the close position;
- said second housing includes
  - a second base wall spaced apart from said first base wall in a third direction perpendicular to the first direction and the second direction,
  - two second side walls connected to said second base wall, spaced apart from each other in the first direction, and respectively connected to said second pivot connecting portion and said second locking unit, and
  - two second guidance walls connected to said second base wall, interconnecting said second side walls, and spaced apart from each other in the second direction; and
- each of said first guidance walls cooperates with a respective one of said second guidance walls to define a respective one of said cable openings when said first housing is at the close position;
- wherein said cable guiding assembly further comprises a guide wheel unit that includes:
  - a first guide wheel mounted rotatably between said first side walls; and
  - two second guide wheels spaced apart from each other in the second direction and mounted rotatably between said second side walls, said second guide wheels being adapted to cooperate with said first guide wheel to guide and clamp the cable thereamong when said first housing is at the close position; and wherein:
- said first base wall has an adjustment screw hole that communicates with said accommodating space when said first housing is at the close position;
- each of said first side walls has a through hole that communicates with said accommodating space and that is elongated in the third direction when said first housing is at the close position;
- said guide wheel unit further includes a first shaft that extends through said first guide wheel, that extends through said through hole of each of said first side walls, and that is movable along said through holes, said first guide wheel being rotatable about and co-movable with said first shaft;

said cable guiding assembly further comprises an adjusting unit that includes an adjusting frame mounted in said first housing, said first shaft extending through said adjusting frame, said adjusting frame being co-movable with said first shaft, and an adjusting rod extending through and threadedly engaging said adjustment screw hole and connected to said adjusting frame, said adjusting rod being rotatable relative to said adjusting frame and being immovable relative to said adjusting frame in the third direction such that rotation of said adjusting rod relative to said first housing drives movement of said adjusting frame, said first shaft and said first guide wheel to adjust a distance between the first guide wheel and said second guide wheels in the third direction.

2. The cable guiding assembly as claimed in claim 1, wherein:

each of said first guidance walls has a first notch formed opposite to said first base wall; and each of said second guidance walls has a second notch formed opposite to said second base wall in the third direction, and cooperating with said first notch to define the respective one of said cable openings when said first housing is at the close position.

3. The cable guiding assembly as claimed in claim 1, wherein:

said adjusting frame includes a main plate, and two lateral plates connected to said main plate and formed respectively with two engaging holes, said first shaft extending through said engaging holes;

said adjusting rod extends through said main plate in the third direction; and when said first housing is at the close position, said lateral plates are disposed respectively at opposite sides of said first guide wheel in the first direction.

4. The cable guiding assembly as claimed in claim 1, wherein:

said first locking unit of said locking mechanism includes two protrusions disposed on the respective one of said first side walls of said first housing, and located respectively at opposite sides of said through hole of the respective one of said first side walls in the second direction, each of said protrusions having an engaging groove;

said second locking unit includes two lugs disposed on the respective one of said second side walls of said second housing, an operating plate pivotable relative to the respective one of said second side walls, and including two pillars that are respectively connected to said lugs, two first connection portions that are connected respectively to said pillars such that said first connection portions are pivotable relative to said lugs, an interconnecting portion that interconnects co-movably to said first connection portions, and an operating portion that is connected co-movably to said interconnecting portion, and a securing plate including two second connection portions that are connected pivotably and respectively to said first connection portions, and two securing portions that are distal from said second connection portions;

when said first housing is at the close position, said operating portion of said operating plate is proximate to said second housing, and said securing portions of said securing plate engage respectively said engaging grooves of said protrusions; and when said first housing is at the open position, said operating portion of said operating plate is away from said second housing, and said securing portions of said securing plate are respectively disengaged from said engaging grooves of said protrusions.

5. The cable guiding assembly as claimed in claim 1, wherein:

said first guide wheel has a first annular groove formed therearound; and each of said second guide wheels has a second annular groove formed therearound and adapted to cooperate with said first annular groove to retain the cable therein when said first housing is at the close position.

6. The cable guiding assembly as claimed in claim 1, wherein:

said first shaft is formed with an axial hole extending therethrough; and said axial hole being adapted for extension of an elongated rod of the cable guide seat therethrough so that said cable guiding assembly is movable along the elongated rod.

7. A cable guiding assembly adapted to be mounted to a cable guide seat and for extension of a cable therethrough, said cable guiding assembly comprising:

a first housing adapted to be mounted to the cable guide seat;

a second housing pivotably connected to said first housing;

a pivot connecting unit including a first pivot connecting portion disposed on said first housing, and a second pivot connecting portion disposed on said second housing and pivotably connected to said first pivot connecting portion such that said first housing is pivotable relative to said second housing between a close position where said first housing and said second housing cooperatively define an accommodating space that has two opposite cable openings adapted to communicate with an external environment and permit the cable to extend therethrough, and an open position for permitting the cable to be installed to and removed from said cable guiding assembly; and a locking mechanism including a first locking unit disposed on said first housing and opposite to said first pivot connecting portion, and a second locking unit disposed on said second housing, opposite to said second pivot connecting portion, and detachably engaging said first locking unit to secure said first housing at the close position;

wherein:

said first housing includes a first base wall, two first side walls connected to said first base wall, respectively connected to said first pivot connecting portion and said first locking unit, and spaced apart from each other in a first direction when said first housing is at the close position, and two first guidance walls connected to said first base wall, interconnecting said first side walls, and spaced apart from each other in a second direction perpendicular to the first direction when said first housing is at the close position;

said second housing includes a second base wall spaced apart from said first base wall in a third direction perpendicular to the first direction and the second direction, two second side walls connected to said second base wall, spaced apart from each other in the first direction, and respectively connected to said second pivot connecting portion and said second locking unit, and two second guidance walls connected to said second base wall, interconnecting said second side walls, and spaced apart from each other in the second direction; and each of said first guidance walls cooperates with a respective one of said second guidance walls to define a respective one of said cable openings when said first housing is at the close position;

wherein said cable guiding assembly further comprises a guide wheel unit that includes:

a first guide wheel mounted rotatably between said first side walls; and two second guide wheels spaced apart from each other in the second direction and mounted rotatably between said second side walls, said second guide wheels being adapted to cooperate with said first guide wheel to guide and clamp the cable thereamong when said first housing is at the close position; and wherein:

each of said first side walls has a through hole communicating with said accommodating space when said first housing is at the close position;

said guide wheel unit further includes a first shaft that extends through said first guide wheel and said through hole of each of said first side walls, and that is formed with an axial hole extending therethrough, said first guide wheel being rotatable about said first shaft; and said axial hole being adapted for extension of an elongated rod of the cable guide seat therethrough so that said cable guiding assembly is movable along the elongated rod.

8. The cable guiding assembly as claimed in claim 7, wherein:

said first locking unit of said locking mechanism includes two protrusions disposed on the respective one of said first side walls of said first housing, and located respectively at opposite sides of said through hole of the respective one of said first side walls in the second direction, each of said protrusions having an engaging groove;

said second locking unit includes two lugs disposed on the respective one of said second side walls of said second housing, an operating plate pivotable relative to the respective one of said second side walls, and including two pillars that are respectively connected to said lugs, two first connection portions that are connected respectively to said pillars such that said first connection portions are pivotable relative to said lugs, an interconnecting portion that interconnects co-movably to said first connection portions, and an operating portion that is connected co-movably to said interconnecting portion, and a securing plate including two second connection portions that are connected pivotably and respectively to said first connection portions, and two securing portions that are distal from said second connection portions;

when said first housing is at the close position, said operating portion of said operating plate is proximate to said second housing, and said securing portions of said securing plate engage respectively said engaging grooves of said protrusions; and when said first housing is at the open position, said operating portion of said operating plate is away from said second housing, and said securing portions of said securing plate are respectively disengaged from said engaging grooves of said protrusions.

9. The cable guiding assembly as claimed in claim 7, wherein:

each of said first guidance walls has a first notch formed opposite to said first base wall; and each of said second guidance walls has a second notch formed opposite to said second base wall in the third direction, and cooperating with said first notch to define the respective one of said cable openings when said first housing is at the close position.

10. The cable guiding assembly as claimed in claim 7, wherein:

said first guide wheel has a first annular groove formed therearound; and each of said second guide wheels has a second annular groove formed therearound and adapted to cooperate with said first annular groove to retain the cable therein when said first housing is at the close position.

* * * * *